(12) United States Patent
Buhlmann

(10) Patent No.: US 6,286,818 B1
(45) Date of Patent: Sep. 11, 2001

(54) INTERNAL MEMBERS FOR MASS TRANSFER COLUMNS

(75) Inventor: Ulrich Buhlmann, Biel-Benken (CH)

(73) Assignee: Kuhni AG, Allschwil (CH)

( * ) Notice: Subject to any disclaimer, the term of this patent is extended or adjusted under 35 U.S.C. 154(b) by 0 days.

(21) Appl. No.: 09/254,223
(22) PCT Filed: Jul. 3, 1998
(86) PCT No.: PCT/CH98/00293
§ 371 Date: Mar. 4, 1999
§ 102(e) Date: Mar. 4, 1999
(87) PCT Pub. No.: WO99/01215
PCT Pub. Date: Jan. 14, 1999

(30) Foreign Application Priority Data

Jul. 4, 1997 (CH) .................................................. 1638/97

(51) Int. Cl.$^7$ ....................................................... B01F 3/04
(52) U.S. Cl. .......................... 261/97; 261/110; 261/112.2
(58) Field of Search .......................... 261/97, 110, 112.2, 261/DIG. 72

(56) References Cited

U.S. PATENT DOCUMENTS

| | | | |
|---|---|---|---|
| 3,595,626 | * 7/1971 | Sowards | 261/DIG. 72 |
| 4,285,910 | * 8/1981 | Kennedy, Jr. | 261/97 |
| 4,501,707 | 2/1985 | Buhlmann . | |
| 4,842,778 | 6/1989 | Chen et al. . | |
| 5,074,331 | * 12/1991 | Kassarjian | 261/97 |
| 5,267,444 | * 12/1993 | Lehman et al. | 261/112.2 |
| 5,302,361 | * 4/1994 | Nagl | 261/DIG. 72 |
| 5,523,062 | 6/1996 | Hearn et al. . | |
| 5,632,934 | * 5/1997 | Billingham et al. | 261/112.2 |

FOREIGN PATENT DOCUMENTS

| | | | |
|---|---|---|---|
| 1086215 | * 8/1960 | (DE) | 261/97 |
| 19524928A1 | 1/1997 | (DE) . | |
| 684060-A | 11/1995 | (EP) . | |
| 961442 | * 6/1964 | (GB) | 261/97 |
| 1005586 | 9/1965 | (GB) . | |
| 1569828 | 6/1980 | (GB) . | |
| WO97 16247 | 5/1997 | (WO) . | |

OTHER PUBLICATIONS

Martin Gann et al., "Problems and experience with industrial scale packed columns", Chem.–Eng.–Tech 64 (1992) No. 1. pp. 6–16.

Soviet Patents Abstracts; Section Ch, Week 922826 Aug. 1992; Derwent Publications Ltd., London GB.

Soviet Patents Abstracts; Section Ch, Week 86318 Aug. 1986, Derwent Publications Ltd., London GB.

* cited by examiner

Primary Examiner—C. Scott Bushey
(74) Attorney, Agent, or Firm—Birch, Stewart, Kolasch & Birch, LL (57) ABSTRACT

Internal members or baffles for material exchange columns have at least one packing bed. The packing bed has at least one first packing block and at least one correction element associated with the first packing block. The first packing block and its associated correction element produce different final distributions of liquid or systematic maldistributions. The systematic maldistribution in the liquid phase caused by the first packing block is largely corrected by the systematic maldistribution of the associated correction element. Such an arrangement makes possible enhanced separation efficiency or higher packing beds.

38 Claims, 5 Drawing Sheets

INTERNAL MEMBERS FOR MASS TRANSFER COLUMNS

This application is the national phase under 35 U.S.C. §371 of PCT International Application No. PCT/CH98/00293 which has an International filing date of Jul. 3, 1998 which designated the United States of America.

TECHNICAL AREA

The present invention concerns internal members or baffles for mass transfer columns, also called column baffles. The invention relates in particular to packing that serve the purpose of mass transfer between a liquid and a gaseous or vapor phase.

STATE OF THE ART

Internal members, also described column baffles, are used in various applications both in thermal separation technology and in mixing technology for mass transfers and heat exchanges between two fluid-phases. They can be installed as separating or mixing members in columns and similar devices, which are used, among other things, for distillation, rectification, sorption, reaction or extraction. In the case of thermal and mass transfer/exchange between a liquid and a gaseous or vapor phase, the members' purpose consists of distributing the gas or vapor and the fluid, which can either flow through the column in the opposite direction of the gas or vapor flow or in the same direction, evenly across the column cross-section and to create as large a liquid surface as possible for mass and thermal transfer/exchange. Plates and/or packings are used as column members. Over the classic plate column, packed columns, i.e. columns whose members consist of packings, offer particular benefits with regard to pressure drop throughout the column, the flow rate and thus also the low thermal stress for sensitive substances. As far as investment costs are concerned, packed columns are usually considerably less expensive than plate columns due to the smaller building volume that is required.

Apart from so-called random packings, structured packings are also being used increasingly as packings for mass transfer columns. When used in distillation columns, structured packings offer especially great benefits in the areas of separation efficiency and increased scaling towards columns with larger diameters as compared to random packings.

Due to their structure, structured packings can be divided further into a "corrugated surface" type and a "grid packing" type. Packings of the corrugated surface type have plates that are crimped in a criss-crossing pattern, which are installed as paraxial members in the columns, and they create only one preferred direction that is recognizable in the cross-section projection of the column due to their structure of the gas or vapor flow as well as the fluid flow for one packing element each. A typically structured packing of the corrugated surface type is shown in DE 26 01 890.

Contrary to this, structured packings of the grid packing type have a grid-shaped, open structure, and the grid elements (lamellae or partial areas) are arranged in a net, grid or fan shape. The grid elements are connected on cross or knot areas, with arrangements possible in two-dimensional or three-dimensional form. Structured packings of the grid packing type can create more than one preferred direction that is recognizable in the cross-section projection of the column due to their structure of the gas or vapor flow and/or the fluid flow for one packing element each. For a suitable grid packing's design or structure even crimped sheets can be used to set up this packing type. A typical structured packing of the grid packing type is the one described in EP 069 241, which is sold under the "Rombopak" brand name.

Structured packings of the corrugated surface type have the advantage of a simpler production procedure over those of the grid packing type. However, due to connected surfaces (closed structure), the disadvantage arises that for structured packings of the corrugated surface type, lower wetting of the packing surface is achieved and thus also a smaller fluid surface for the mass transfer and heat exchange than is the case with grid packings. Therefore, higher efficiency in the separation can be achieved with separation columns equipped with structured packings of the grid packing type than can be achieved with separation columns equipped with packings of the corrugated surface type.

In applications with high purity requirements, however, the utilization of packed rectification columns still meets with resistance in the industry because the maldistribution problem, especially in the fluid phase, occurs both with random packings and structured packings. Maldistribution manifests itself through the fact that a fluid flow, which initially is evenly distributed over the cross-section of the column, displays uneven final fluid distribution after having passed through the packing. The separation efficiency's quality, however, depends on the evenness of the gas or vapor and fluid over the entire cross-section of the column's interior along the flow path and the intensity of its mixing process. The maldistributions occurring in the fluid and vapor flows can be divided into two different maldistribution types. Stochastic maldistribution describes a (random) small-scale maldistribution. Over large surface areas, distribution evens out. Systematic maldistribution, on the other hand, characterizes a large-scale maldistribution in relation to the column cross-section. In industrial reality, stochastic maldistribution is always superimposed on systematic maldistribution.

A special type of stochastic maldistribution is the insufficient, rough pre-distribution of the fluid above a packing bed. Over a large surface the fluid flow is evenly distributed, i.e., into a certain number of evenly distributed partial fluid flows of the same kind, generated by the fluid distributor that is utilized. Over a small surface, however, maldistribution occurs, i.e., surface areas without fluid supply and areas where there is a fluid flow of the distributor. This type of stochastic maldistribution due to insufficient pre-distribution of the fluid can be improved through sophisticated distributors or additional distribution aids.

From DE 44 18 488, we know that an increased flow of fluid and vapor occurs in the area of the column wall—the so-called wall effect, a special type of systematic maldistribution —since the random packing's or packing's wall layer offers lower resistance. In these areas, the fluid participates insufficiently in mass transfer. According to the article "Problems and Experiences with Large Technical Packing Columns, Chem.-Eng.-Tech. 64 (1992), No. 1, pages 6–16" by Martin Gann et al., it is true that, due to their structure, structured packings run a lower risk of systematic maldistribution than random packings, however they are not—as previously assumed—self-distributing.

In particular systematic maldistribution in the fluid and vapor flow causes negative effects on separation efficiency because balanced mixing over the column cross-section is not ensured. In the case of stochastic maldistribution on the other hand, more or less distinct cross-mixing can continuously balance and compensate for the negative influence.

As can be seen, among other things, from DE 44 18 488, packing manufacturers recommend multiple collection of the fluid and its redistribution over intermediate distributors as a common remedy for maldistribution. To achieve this, the packing is divided into several beds between which the fluid collector and the intermediate distributor are arranged. This measure is beneficial for both types of maldistribution mentioned above; mainly, however, to eliminate systematic maldistribution. In the utilization of fluid collectors and distributors, however, their cost and the increased building height of the columns proved to be disadvantageous.

To avoid the sophisticated collector and intermediate distributor mentioned above, attempts have been made to utilize distribution elements which include the function of both collecting and redistributing the fluid. U.S. Pat. No. 5,523,062A (Chemical Research & Licensing Company) deals with such a combined distribution element for even distribution of gas and liquid flow, which is suited for a catalytic distillation column. The zigzag-shaped distribution element is arranged crosswise between the packing elements, with flow openings for the gas and fluid being arranged exclusively at the peaks and valleys of the zigzag (corrugated) structure. Unfortunately, it was shown that such combined redistribution devices are not very effective. First the fluid is not mixed completely, and second an even degree of distribution is very difficult to achieve.

To improve and compensate for stochastic maldistribution, it was suggested to arrange distribution elements on both limitations of a packing bed (top and bottom), but also between the packing beds:

U.S. Pat. No. 4,842,778 A (Glitsch Inc.) suggests arranging three distribution elements each on the upper and lower ends of a packing bed at a low height, whose primary function would consist of improving the initial distribution of the gas and fluid flow. The distribution elements consist of the "corrugated surface" packing type. They can also be arranged within a packing bed to reinforce the even and unified distribution of fluid and vapor. Installation of multiple distribution elements, moreover, strives to eliminate separate fluid and vapor distributors.

SU 1 681 924 A (Stytsenko) recommends arranging one or more distribution elements (or redistribution packings) at the beginning of a packing immediately after the fluid distributor, but also within a packing bed, to distribute the fluid flow more evenly. This causes secondary distribution of the fluid after the distributor and/or avoids local irregularities (stochastic maldistribution). In this case, both the packing and the redistribution packages are the "corrugated surface" type.

In DE 44 18 448 a procedure and device are suggested as an improved solution for overcoming the systematic maldistribution problem created in particular from the wall effect, wherein an intended maldistribution of the fluid dripping density is created above the column cross-section by appropriately designing the fluid distributor in order to compensate for systematic maldistribution of the liquid phase generated by the following packing bed. Intensive examinations and numerous tests performed by the applicant of the present invention have shown, however, that the solution according to DE 44 18 488 does not solve the problem of systematic maldistribution, but only shifts it locally. While the evenness of fluid distribution is good on the top and poor on the bottom without well-aimed maldistribution of the fluid dripping density on the upper end of a packing bed, intentional maldistribution of the fluid dripping density causes the evenness of the fluid distribution to be poor on the top and good on the bottom.

WO 97/16247 A (Sulzer) recommends arranging neighboring packing elements at a distance to each other to reduce the pressure drop in the vapor flow and to arrange so-called fluid control means in the space between neighboring packing elements. The only result of this, however, is controlled drainage of the fluid and channeling to the next lower packing. In particular, accumulation of the fluid on the lower packing edge of the upper packing, respectively, and the thus-generated maldistribution are to be avoided.

According to the article by Martin Gann et al. mentioned above, the problem of systematic maldistribution for packings is aggravated by the so-called "scale up", i.e. enlargement of the columns from a laboratory or pilot scale to a large technical scale because both random packings and structured packings are missing exactly defined fluid channeling as classic column plates do. During "scale-up" from a laboratory or pilot column to a large technical rectification column difficulties arise, especially in estimating the separation efficiency of random packings, because generally different packing sizes are used. Although this problem is reduced with structured packings, it nevertheless continues to exist.

PRESENTATION OF THE INVENTION

It is the object of the present invention to make available internal elements for mass transfer columns with which the known disadvantages associated with the phenomenon of systematic maldistribution occurring on packings are avoided and which thus allow high packing beds with high separation efficiency.

According to the invention, internal elements for mass transfer columns consist of at least one packing bed, which has at least one first packing block and at least one correction element assigned to the block, with the first packing block and its assigned correction element generating different final fluid distributions, i.e., different systematic maldistributions, and the packing block and its assigned correction element being arranged and selected in such a way that systematic maldistribution of the liquid phase generated by the packing block is corrected at least in part by that of the assigned correction element.

The invention is based on the known fact that, on the one hand, a characteristic distribution of the fluid is created on column packings (in particular for random packings, but also with structured packings) after a certain packing height, which can change its extent, but not its basic pattern (characteristic final distribution for column packing). Based on the terminology explained above, this characteristic final distribution is a systematic maldistribution. On the other hand, the invention proceeds from new knowledge according to which—contrary to a widely held opinion among experts—in the case of structured packings of the grid packing type, it is not an increased fluid flow that is generated in the area of the column wall as on other packing types, the so-called wall effect, but rather a weakened fluid flow, the so-called wall depletion.

In the following description and claims, various terms are used for the different parts of columns internal elements whose meanings are explained here for clarification and respective limitation purposes:

A packing element describes a generally cylindrical element of the packing with the diameter of the column, which is usually produced in standard heights of 200 to 250 mm.

A packing block is a sequence of one or more packing elements of the same kind that are arranged immediately on top of each other. Contrary to packing beds defined below, a packing block is not interrupted by packing elements of a different kind or by fluid control means.

Packing type is the (uniform) type of a packing block or a packing element, e.g., random packing, grid packing, corrugated surface, etc.

A generally cylindrical element with the column's diameter, whose main task consists of conducting the fluid phase in the column, i.e., generating regular, specific fluid distribution after having passed through, or on occasion intentional systematic maldistribution, is described as a fluid control means. Contrary to this, the main task of a packing element consists in creating as large a mass transfer surface as possible and in maintaining an evenly distributed fluid and vapor flow.

Correction element is an element for the correction of systematic maldistribution of the liquid phase flowing through the column by generating a specific final fluid distribution or intended systematic maldistribution; it may consist of a packing block or a fluid control means.

The sequence of at least one packing block and, if so selected, further packing blocks and/or correction elements arranged on top of each other, which is not interrupted by a fluid collector, is described as a packing bed. A packing bed can have packing blocks of different packing types and fluid control means.

Column internal elements are a sequence of one or more packing beds arranged on top of each other.

In a very simple version of the invention, the correction element consists of only one fluid control means. Since fluid control means can be built at a very small height, this version or the invention offers the advantage that the height of the correction element is very small compared to the total packing height. One possible very simple version of a fluid control means is the arrangement of concentric cone-shaped surfaces, which channel the fluid away from the column wall or towards it. This way, it is possible to correct wall effects or wall depletion of a packing.

In a particularly preferred version of the present invention, the correction element that is assigned to the first packing block consists of a second packing block, with the first packing block and the second packing block of the correction element being of different packing types. This version of the invention is characterized by the fact that the entire packing bed is suited and designed for mass transfer, without wasting unproductive height for correction elements. Compared to fluid control means, this version also offers considerable cost benefits. In a preferred version, the first packing block and the second packing block of the assigned correction element are selected with regard to their packing type in such a way that a wall effect is created on one of the two packing blocks and wall depletion of the fluid flow on the other: i.e. two opposite, special forms of systematic maldistribution. This is the case, for example, when packing elements of the grid packing type are chosen for the first packing block and packing elements of the corrugated surface or random packing type are selected for the second packing block of the assigned correction element, or vice versa.

The total height of packing blocks of the first packing block type (main packing part) preferably exceeds that of packing blocks of the second packing block type (correction packing part) to a considerable extent. This version of the present invention proves particularly beneficial when the packing type of the correction packing part displays disadvantages over the packing type of the main packing part; for example, with regard to production cost or separation efficiency. At a smaller total height of the correction packing part compared to the main packing part, the correction packing part's disadvantages have a smaller effect on the entire packing bed. However, the overall height of the correction packing part and its arrangement within the main packing part must be selected in such a way that the generated systematic maldistribution is largely compensated for. In a preferred version of the present invention, the main packing part is at least three times as high as the correction packing part; particularly preferred is a height that is six to ten times that of the correction packing part, with the high packing beds of the main packing part being divided by several blocks of the correction packing.

In a particularly preferred version of the present invention, the main packing part is of the grid packing type and the correction packing part of the corrugated surface type because in this case both of them are structured packing types. This leads to high separation efficiency and a high throughput, for example, when applied to a rectification column. This version of the present invention also proves particularly beneficial with regard to the gas or vapor flow because, on the one hand, packing blocks of the grid packing type (as well as those of the random packing type) lead to a equalizing of the gas flow and thus function to align the gas flow and, on the other hand, packing blocks of the corrugated surface type increase the mixing effect in the gas flow. This also reduces the damaging effects of maldistribution on separation efficiency.

Furthermore, it is preferred that the first packing block and its assigned correction element have basically the same hydraulic capacity (expressed as the flooding point or flooding limit) so that the hydraulic capacity of the total packing bed is not limited by that of the correction element. For the version with a main packing part and correction packing part in applications for rectification or absorption columns, it is beneficial for similar reasons if the correction packing part's properties do not differ considerably from those of the main packing part with regard to separation efficiency and pressure drop. In the above-mentioned particularly preferred version, the correction packing part therefore has roughly the same specific packing surface (i.e., approximately the same packing density) as the main packing part.

In another preferred version of the present invention, at least one of the first and/or other packing blocks consists of packing elements of the kind that creates a recognizable preferred direction in the horizontal cross-section projection of the column due to the structure of the gas or vapor flow and/or fluid flow, with the packing elements of this block being arranged in an angularly rotated vertical sequence to each other around the column axis. In the particularly preferred version of the present invention mentioned above, with one main packing part of the grid packing type and one correction packing part of the corrugated surface type, the packing blocks each consist of partial blocks of two packing elements, which preferably are rotated at a 90° angle relative to one another around the column axis.

Another version that is especially attractive with regard to its investment costs is the combination of random packings as the main packing part with grid packing as the correction packing part. This allows the utilization of tower packing, even with large column diameters and raised packing beds, especially for simple separation problems or also for contaminating fluids that contain solid matters.

Apart from the above-mentioned versions of the present invention, further beneficial sandwiching combinations of packing blocks of various packing types are possible, depending on the application, to reduce the fluid's systematic maldistribution generated by the packing blocks through appropriate combinations of different final fluid distributions of the individual packing types. Also worth mentioning are, in particular, alternating sequences of two packing elements each of the grid packing type and two each of the corrugated surface type of approximately the same height. Finally, it is also feasible to use alternating sequences of only one packing element. This should be used when various packing types that differ in their final fluid distribution have nearly the same values regarding separation efficiency, pressure drop and capacity.

The following detailed description, with reference to the enclosed drawings, is merely intended to provide an example for a better understanding of the invention and is not to be regarded as a limitation of the scope of protection of the present invention as described in the patent claims. An expert will easily recognize further advantageous versions and combinations of features from the following description, combined with the enclosed drawings and the patent claims; these versions, however, are still within the limits of the present invention.

BRIEF DESCRIPTION OF THE DRAWINGS

The drawings illustrate a mass transfer column according to the current state of the art as well as preferred versions of the present invention. More particularly.

As a rule, the same parts are marked with the same reference numbers in the figures.

DETAILED DESCRIPTION OF THE INVENTION

Figure 1:
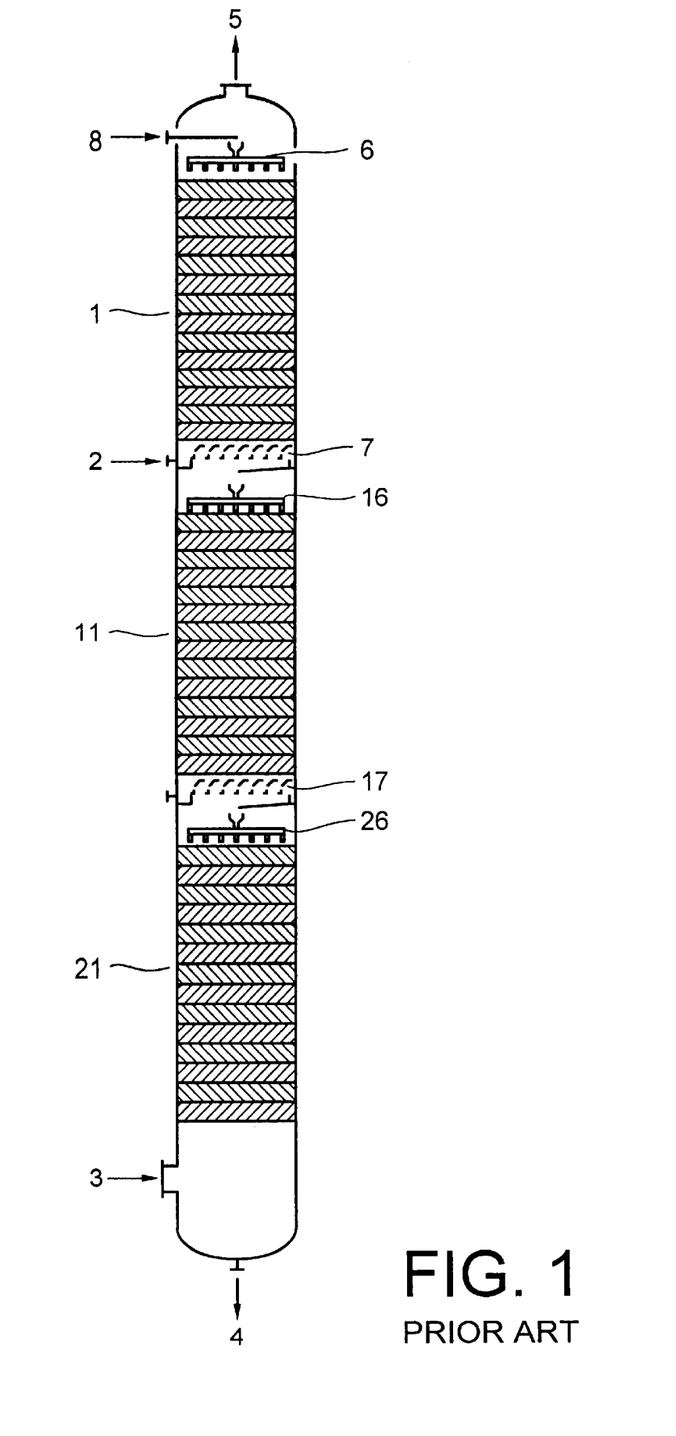
FIG. 1 Illustrates a mass transfer column according to the current state of the art.

FIG. 1 shows a mass transfer column suitable for distillation or rectification—i.e. a distillation column—with column members divided into packing beds 1, 11, 21 according to the known state of the art. For structured packings, the packing beds 1, 11, 21 consist of individual packing elements that are arranged on top of each other. The fluid that is to be separated is fed into the distillation column through the fluid supply 2. Together with fluid trickling down from the packing bed 1 located above, the supply is distributed evenly over the cross-section of the column, or its packing bed 11, via a fluid distributor 16. The fluid flows through the packing beds 11, 21 in the column interior down toward the fluid drainage 4, through which the fluid, enriched with the less volatile components from the distillation column, exits as a bottom product. In the packing beds 11, 21 the liquid phase comes into intimate contact with a gaseous or vapor phase, which is created by vaporizing a part of the bottom product and flows through the gas or vapor supply 3 into the column, up through the packing beds 21, 11, 1 and out of the column through the gas or vapor outlet 5, enriched with the more volatile materials. During rectification, part of the overhead products flowing out through the gas or vapor outlet 5 are condensed and fed back into the column interior as reflux 8, where it is distributed evenly over the cross-section of the packing bed 1 via a fluid distributor 6 and flows downward through the packing bed 1.

As a remedy against maldistribution caused by the packing, in particular systematic maldistribution, as well as for the distribution of the supply 2, internal members of the column are divided into several packing beds 1, 11, 21. On the lower end of each packing bed 1, 11 (except for the one on the very bottom) the fluid is gathered by a fluid collector 7, 17 and re-distributed evenly over the cross-section of the column or the packing beds 11, 21 via a fluid distributor 16, 26 so that there is even fluid distribution optimal for distillation at least on the upper end of the following packing bed 11 and 21.

Figure 2A:
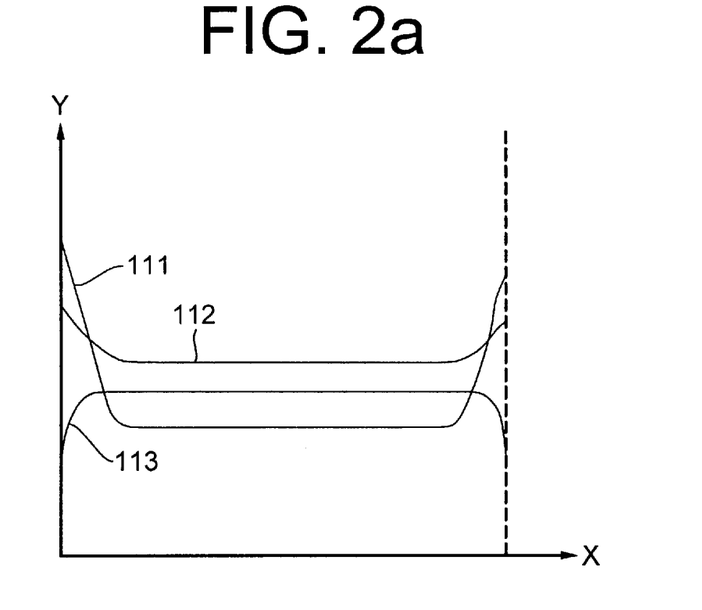
FIG. 2a is a diagram representing liquid load along the column diameter for different packing types (characteristic final fluid distribution or systematic maldistribution)
Figure 2B:
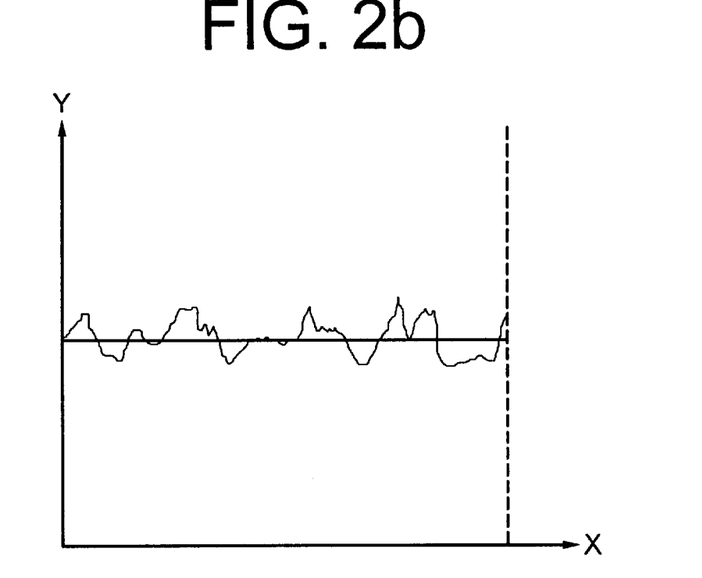
FIG. 2b is a diagram of stochastic final fluid distribution along a column diameter.

As soon as the fluid has covered a certain length in the packing bed 1, 11, 21 underneath the fluid distributor 6, 16, 26, it is no longer completely evenly distributed over the column cross-section due to the effect of the packing bed 1, 11, 21 which negatively influences the distillation column's separation efficiency. This phenomenon of maldistribution is shown in FIGS. 2a and 2b for various packing types. In FIGS. 2a and 2b, the local liquid load along the diameter (x-axis) through a mass transfer column is shown on the y-axis. The sketches in FIG. 2a depict above-mentioned final distribution, or systematic maldistribution, which is characteristic for the respective column packing. Curve 111 shows the typical diagram of a packing bed of the random packing type, curve 112 the diagram of a packing bed of the corrugated surface type, and curve 113 the diagram of a packing bed of the grid packing type. Diagrams 111 and 112 show that systematic maldistribution of fluid manifests itself in the form of wall effect for packing beds of the random packing and corrugated surface type, with the wall effect for random packing being much more distinct than that of corrugated surface packing. Diagram 113 shows that systematic maldistribution of fluid manifests itself in the form of wall depletion for packing beds of the grid packing type. When selecting the appropriate packing height, the extent of wall depletion corresponds roughly to the extent (with reversed sign) of wall effect for corrugated surface types. Similarly, FIG. 2b depicts stochastic maldistribution. The sketch shows that even distribution is achieved when averaging the fluid load over larger partial areas.

Figure 3:
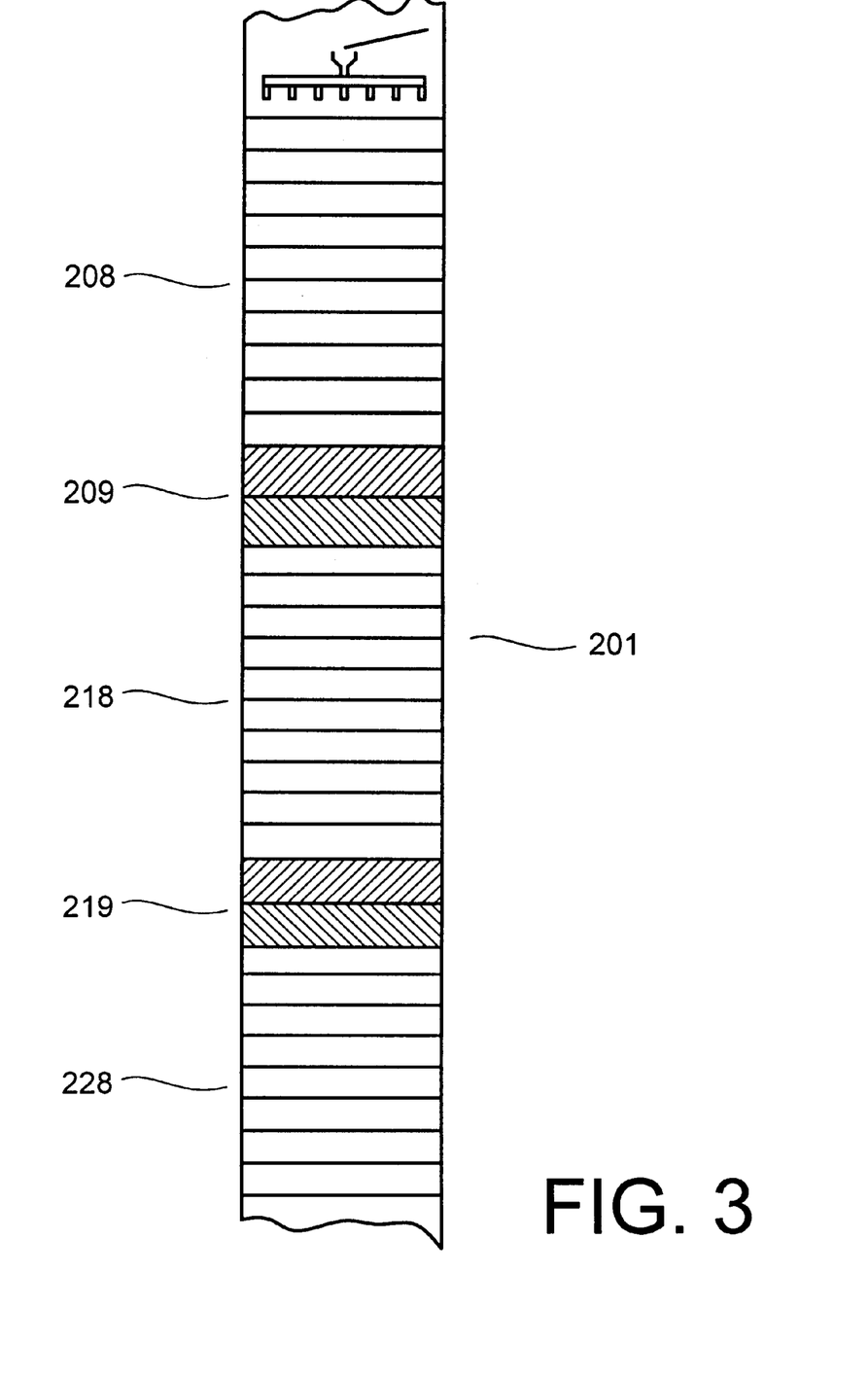
FIG. 3 is a view of internal members for mass transfer columns according to a particularly preferred embodiment of the present invention, consisting of a main packing part of the grid packing type and a correction packing part of the corrugated surface type.

In the partial view of a packing bed 201 according to a particularly preferred version of the present invention depicted in FIG. 3, the properties of packings of the grid packing and the corrugated surface type, which can be seen in FIG. 2a, are utilized. The packing bed 201 according to this version of the invention consists of a first packing block 208 of the grid packing type, following by a packing block 209 of the corrugated surface type, a packing block 218 of the grid packing type, a packing block 219 of the corrugated surface type, and a packing block 228 of the grid packing type. Therefore the packing bed 201 is a sequence of three packing blocks (208, 218, 228) of the grid packing type (main packing part) and two packing blocks (209, 219) of the corrugated surface type (correction packing part) arranged in between them.

The packing blocks 209, 219 of the corrugated surface type of the correction packing part consist of two packing elements each per packing block, which are rotated at 90° relative to one another around the column axis. In the distillation column shown in FIG. 3, the correction packing part has approximately the same specific packing surface (i.e., about the same packing density) as the main packing part. Furthermore, the correction packing part has roughly the same hydraulic capacity (expressed as flooding point or flooding limit) and separation efficiency as the main packing part. The main packing part's height is at least three times that of the correction packing part, preferably six to ten times greater.

Due to the final fluid distribution recognizable from FIG. 2a, systematic maldistributions of the fluid, which are caused by the main packing part and the correction packing part, are largely compensated for. In tests conducted with a distillation column according to this preferred version of the invention, separation efficiencies considerably higher than 30 theoretical separation stages were achieved for one packing bed. With the present invention, high bed heights can be realized with high separation stage numbers, which according to the state of the art had to be divided further with the help of fluid collectors and distributors (see FIG. 1, two lower packing beds).

During another test conducted with a distillation column in accordance with FIG. 3, the separation efficiency of a 3.5 m-high packing bed without correction packing part was compared to that of a 7.5 m-high packing bed, one arranged according to FIG. 3 and one arranged the same way; however, additional packing elements of the grid packing type were used instead of the packing elements of the corrugated surface type so that the packing consisted of only one main packing part instead of a main packing part and a correction packing part. The test showed that without the correction packing part the separation efficiency per bed height decreased considerably on the 7.5 m-high packing bed compared to the 3.5 m-high packing bed, while it remained unchanged or decreased only slightly with the correction packing part.

Figure 4:
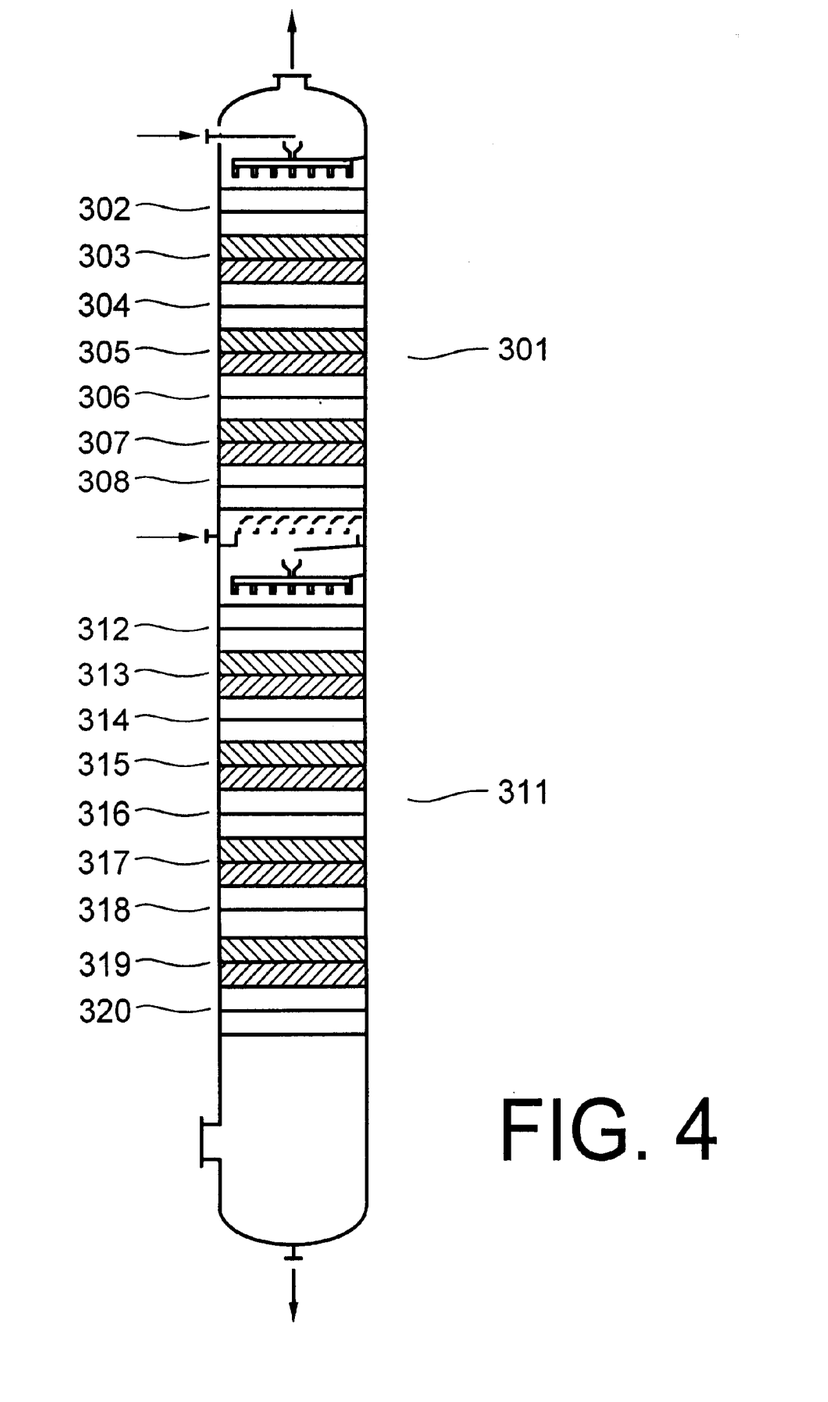
FIG. 4 illustrates internal members for mass transfer column according to a different embodiment of the present invention, consisting of an alternating sequence of two packing elements each of the grid packing type and two packing elements each of the corrugated surface type of the same height.

FIG. 4 depicts a mass transfer column of a different preferred version of the present invention. The packing beds 301, 311 consist of an alternating sequence of a first packing block 302, 312 out of two packing elements of the grid packing type and an assigned correction element 303, 313, consisting of two packing elements of the corrugated surface type of about the same height as the elements of the first packing blocks 302, 312, followed by packing blocks 304–308, 314–320, of the grid packing type and the corrugated surface type respectively.

Figure 5:
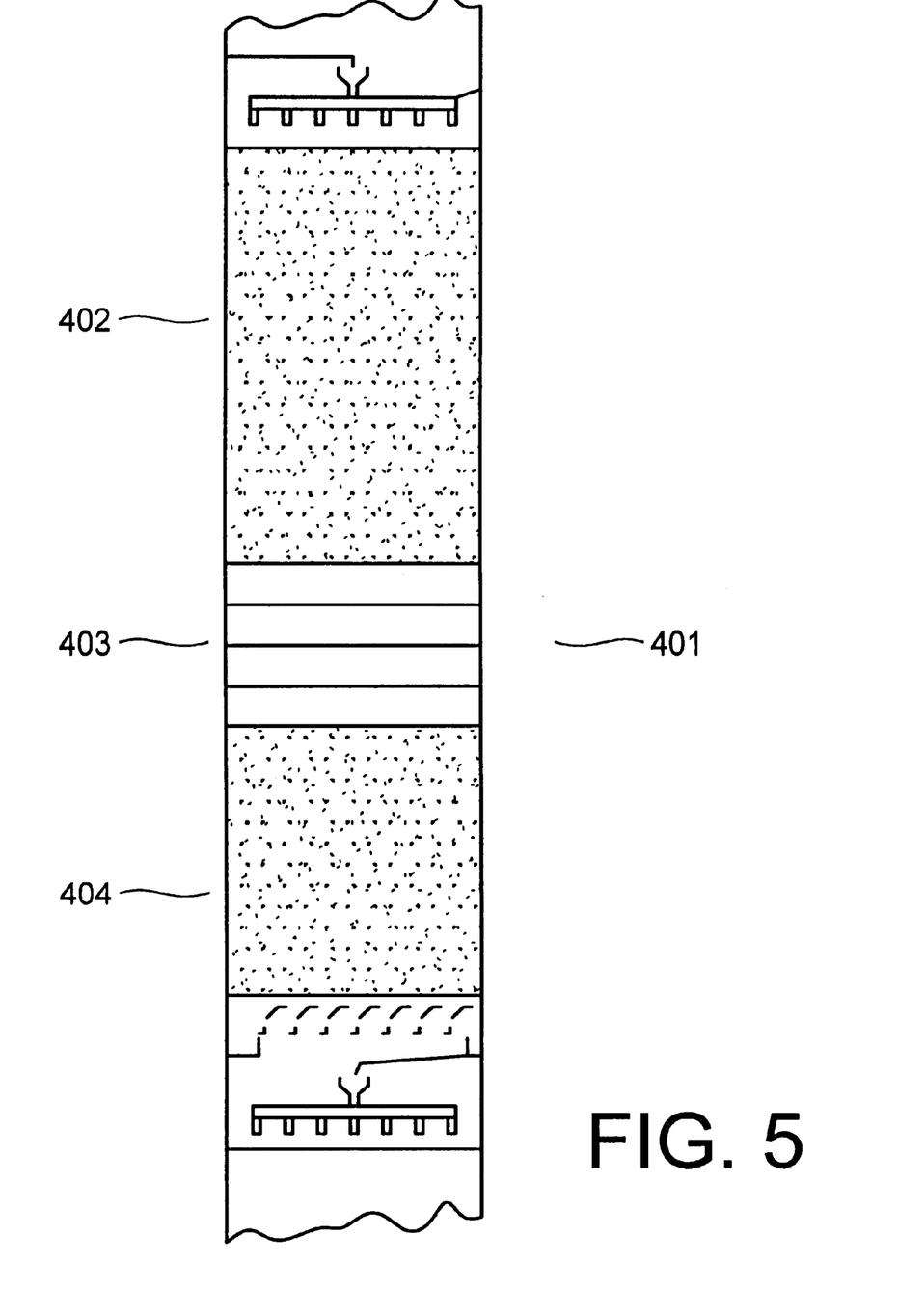
FIG. 5 is a partial view of internal members for mass transfer columns according to another preferred version of the present invention, consisting of a main packing part of the random packing type and a correction packing part of the grid packing type.

The mass transfer column in accordance with the version of the invention shown in FIG. 5 has a packing bed 401, which consists of a first packing block 402 of the main packing part of the random packing type, another packing block 403 of the correction packing part of the grid packing type, and a third packing block 404 of the main packing part of the random packing type. The investment costs for a packing bed 401 according to the version of the invention shown here are considerably lower than those for a packing bed 201 because only the comparatively small correction packing part 403 consists of relatively expensive packing elements of the grid packing type, while the much larger main packing part 402, 404 consists of less expensive random packings.

In summary, it should be noted that the invention provides internal members for mass transfer columns wherein the known phenomenon of systematic maldistribution of fluids occurring on packings is suppressed considerably, resulting in the advantages mentioned earlier.

What is claimed is:

1. Internal members for a mass transfer column, said column comprising at least one packing bed, said packing bed comprising at least a first packing block and at least one correction element associated with the first packing block, wherein said correction element comprises at least a second packing block, said first packing block and said second packing block being of different packing types, and said first and second packing blocks generate different systematic maldistribution in the liquid phase, the systematic maldistribution in the liquid phase generated by said second packing block substantially compensating for the maldistribution in the liquid phase of the first packing block.

2. Internal members according to claim 1, wherein the systematic maldistribution of one of said first and second blocks is a wall effect and the systematic maldistribution of the other said packing block is a wall depletion.

3. Internal members according to claim 1, wherein one of said first and second packing blocks is of a packing type that mainly equalizes the gaseous and vapor flow and the other said packing block is a packing type that mainly causes a mixing in the gaseous or vapor flow.

4. Internal members according to claim 1, wherein said first and second packing blocks are selected from the group consisting of grid packing type and corrugated surface packing type.

5. Internal members according to claim 1, wherein said first and second packing blocks are selected from the group consisting of random packing type and grid packing type.

6. Internal members according to claim 1, wherein at least one of said first and second packing blocks consists of packing elements that create a preferred direction of the gas or vapor flow or the fluid flow in the horizontal cross-section projection of the column through their structure.

7. Internal members according to claim 6, wherein the packing elements which create a preferred direction of flow are rotated 90° to one another around a column axis.

8. Internal members according to claim 1, wherein said first packing block has approximately the same hydraulic capacity as said second packing block.

9. Internal members according to claim 1, wherein the height of a main packing part consisting of packing blocks of the packing type of said first packing block considerably exceeds the packing height of a correction packing part consisting of packing blocks of the packing type of said second packing block.

10. Internal members according to claim 9, wherein said main packing part is six to ten times as high as said correction packing part.

11. Internal members for a mass transfer column comprising at least one packing bed, said packing bed comprising at least one first packing block and at least one correction element associated with the first packing block, wherein said correction element comprises at least a second packing block, said first and second packing blocks being of different packing types, said first and second packing blocks having approximately the same hydraulic capacity, and said first and second packing blocks generate respectively different systematic maldistribution in the liquid phase, the systematic maldistribution of the second packing block compensating for the systematic maldistribution of the first packing block.

12. Internal members according to claim 11, wherein the systematic maldistribution of one of said first and second packing blocks is a wall effect and the systematic maldistribution of the other of said packing blocks is a wall depletion.

13. Internal members according to claim 11, wherein one of said first and second packing blocks is of a packing type that mainly equalizes the gaseous and vapor flow and the other said packing block is a packing type is a packing type that mainly causes a mixing in the gaseous or vapor flow.

14. Internal members according to claim 11, wherein said first and second packing blocks are selected from the group consisting of grid packing type and corrugated surface packing type.

15. Internal members according to claim 11, wherein said first and second packing blocks are selected from the group consisting of random packing type and grid packing type.

16. Internal members according to claim 11, wherein at least one of said first and second packing blocks consists of packing elements that create a preferred direction of the gas or vapor flow or the fluid flow in the horizontal cross-section projection of the column through their structure.

17. Internal members according to claim 16, wherein the packing elements which create a preferred direction of flow are rotated 90° to one another around a column axis.

18. Internal members according to claim 11, wherein a main packing part consists of packing blocks of the packing type of said first packing block, said main packing part having a height that exceeds the packing height of a correction packing part which consists of packing blocks of the packing type of said second packing block.

19. Internal members according to claim 18, wherein said main packing part is six to ten times as high as said correction packing part.

20. Internal members for a mass transfer column, said column comprising at least one packing bed, said packing bed comprising at least a first packing block and at least one correction element associated with the first packing block, wherein said correction element comprises at least a second packing block, said first packing block and said second packing block being of different packing types, said first and second packing blocks having approximately equal separation efficiency, and said first and second packing blocks generate different systematic maldistribution in the liquid phase, the systematic maldistribution in the liquid phase generated by said second packing block substantially compensating for the maldistribution in the liquid phase of the first packing block.

21. Internal members according to claim 20, wherein the systematic maldistribution of one of said first and second blocks is a wall effect and the systematic maldistribution of the other said packing block is a wall depletion.

22. Internal members according to claim 20, wherein one of said first and second packing blocks is of a packing type that mainly equalizes the gaseous and vapor flow and the other said packing block is a packing type that mainly causes a mixing in the gaseous or vapor flow.

23. Internal members according to claim 20, wherein said first and second packing blocks are selected from the group consisting of grid packing type and corrugated surface packing type.

24. Internal members according to claim 20, wherein said first and second packing blocks are selected from the group consisting of random packing type and grid packing type.

25. Internal members according to claim 20, wherein at least one of said first and second packing blocks consists of packing elements that create a preferred direction of the gas or vapor flow or the fluid flow in the horizontal cross-section projection of the column through their structure.

26. Internal members according to claim 25, wherein the packing elements which create a preferred direction of flow are rotated 90° to one another around a column axis.

27. Internal members according to claim 20, wherein said first packing block has approximately the same hydraulic capacity as said second packing block.

28. Internal members according to claim 20, wherein the height of a main packing part consisting of packing blocks of the packing type of said first packing block considerably exceeds the packing height of a correction packing part consisting of packing blocks of the packing type of said second packing block.

29. Internal members according to claim 28, wherein said main packing part is six to ten times as high as said correction packing part.

30. Internal members for a mass transfer column comprising at least one packing bed, said packing bed comprising at least one first packing block and at least one correction element associated with the first packing block, wherein said correction element comprises at least a second packing block, said first and second packing blocks being of different packing types, said first and second packing blocks having approximately equal separation efficiency and approximately the same hydraulic capacity, and said first and second packing blocks generate respectively different systematic maldistribution in the liquid phase, the systematic maldistribution of the second packing block compensating for the systematic maldistribution of the first packing block.

31. Internal members according to claim 30, wherein the systematic maldistribution of one of said first and second packing blocks is a wall effect and the systematic maldistribution of the other of said packing blocks is a wall depletion.

32. Internal members according to claim 30, wherein one of said first and second packing blocks is of a packing type that mainly equalizes the gaseous and vapor flow and the other said packing block is a packing type is a packing type that mainly causes a mixing in the gaseous or vapor flow.

33. Internal members according to claim 30, wherein said first and second packing blocks are selected from the group consisting of grid packing type and corrugated surface packing type.

34. Internal members according to claim 30, wherein said first and second packing blocks are selected from the group consisting of random packing type and grid packing type.

35. Internal members according to claim 30, wherein at least one of said first and second packing blocks consists of packing elements that create a preferred direction of the gas or vapor flow or the fluid flow in the horizontal cross-section projection of the column through their structure.

36. Internal members according to claim 35, wherein the packing elements which create a preferred direction of flow are rotated 90° to one another around a column axis.

37. Internal members according to claim 30, wherein a main packing part consists of packing blocks of the packing type of said first packing block, said main packing part having a height that exceeds the packing height of a correction packing part which consists of packing blocks of the packing type of said second packing block.

38. Internal members according to claim 37, wherein said main packing part is six to ten times as high as said correction packing part.

* * * * *